Sept. 1, 1964 G. J. GIEL ETAL 3,147,471

DIGITIZING ELECTRICAL SYSTEM

Filed June 24, 1960 2 Sheets-Sheet 1

George J. Giel,
Ray K. Livengood,
*INVENTORS.*

BY Byard G. Nilsson

ATTORNEY.

DIGITIZING ELECTRICAL SYSTEM

Filed June 24, 1960

George J. Giel,
Ray K. Livengood,
*INVENTORS*

*BY* Byard G. Nilsson
*ATTORNEY.*

3,147,471

DIGITIZING ELECTRICAL SYSTEM

George J. Giel, Los Angeles, and Ray K. Livengood, Torrance, Calif., assignors to Electro-Logic Corporation, Venice, Calif., a corporation of California Filed June 24, 1960, Ser. No. 38,539
12 Claims. (Cl. 340—347)

The present invention relates to a digitizing apparatus for providing digital manifestations representative of analog signals.

In general, two forms of electrical signals are widely employed to represent numerical information. Analog form signals are amplitude scaled to numerical values, while, digital signals have discrete levels to represent individual numerical digits. Analog signals are normally formed by devices for sensing various phenomena and are often converted to a digital presentation so as to be more accurately observed or handled either manually or in a data-processing system. Therefore, a need exists for an economical and accurate apparatus to digitize analog signals.

It has been previously proposed to provide digital manifestations representative of analog signals with a revolving drum (or disk) which carries digital values about its periphery. A control system then activates the drum at the proper time to provide a digital presentation of the observed value. In general, devices of this type have been successfully employed as digital voltmeters, position indicators and similar instruments. However, digital presentations from prior instruments of this type have sometimes been difficult to observe. For example, the control system may operate the drum or disk at a time when the latter is positioned between numerical values. As a result, the indications of the drum may be ambiguous. Also, the system may be difficult to accurately observe upon the occurrence of spurious components in the observed signal. Therefore, a need exists for a system to digitally present numerical values represented by an analog signal, which system can be accurately read or sensed.

In general, the present invention comprises a digitizing apparatus for manifesting analog signals in digital form. A revolving drum apparatus carrying digital indications is sensed during brief intervals to provide the digital presentation. A signal generator is then incorporated with the drum apparatus to provide an analog signal which varies as the digital indications of the drum. A comparison apparatus then compares the output from the signal generator with the input analog signal to form a control signal which activates the drum apparatus when these signals coincide in amplitude. In this manner, the drum apparatus presents a value coinciding to the value of the analog signal. Additionally a variable-delay means is provided which may be employed to further control the drum to present values only during intervals when the values are cleanly indicated. Furthermore, a damping control apparatus may be provided to render the system insensitive to spurious signals.

An object of the present invention is to provide an improved digitizing system.

Another object of the present invention is to provide a digitizing system which may be economically manufactured and which functions to accurately digitize values represented by an analog signal.

Still another object of the present invention is to provide an improved digital voltmeter which clearly and unambiguously presents numerical values represented by a received analog signal.

A further object of the present invention is to provide an improved digital voltmeter which is stable to quantize and digitize an electrical analog signal.

These and other objects and advantages of the present invention will become apparent from a consideration of the following, taken in conjunction with the appended drawings, wherein.

Figure 1:
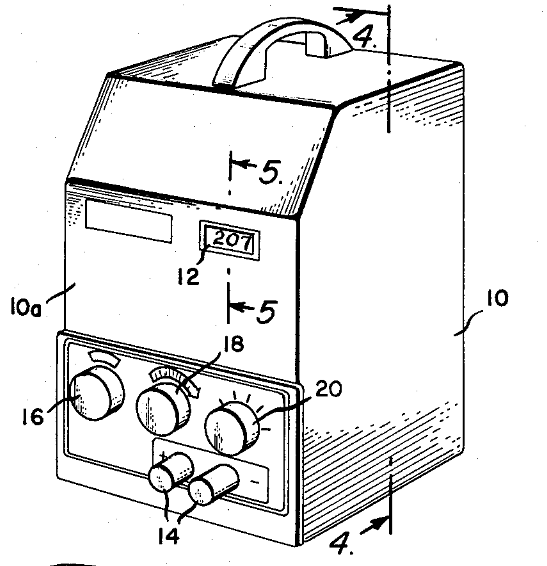
FIGURE 1 is a perspective view of an apparatus constructed in accordance with the present invention.

Referring initially to FIGURE 1, there is shown a cabinet 10 containing an apparatus of the present invention. The analog signal voltage to be observed is applied across terminals 14, which are affixed to the front panel 10*a*, of the cabinet 10, and numbers representing the observed voltage are presented on a screen 12, also in the front panel 10*a*. Above the terminals 14, are mounted knobs 16, 18 and 20. The knob 16 has three stable positions to provide three basic operation modes, i.e. "standby," "digital manifestation," and "quasi-digital manifestation." When the system is in a "standby" state, the circuits are all energized; however, no readout operations are performed. In the "digital" mode of operation, the observed voltage is essentially quantized, and the numbers appearing on the screen 12 are centered at all times. In "quasi-digital" operation the analog signal is not quantized in the conversion; therefore, the values appearing on the screen 12 may appear to slide during a change in the observed signal, rather than to jump cleanly from one number to another.

The knob 18 on the front panel is continuously variable and provides damping control by varying the sensitivity of the system to rapid changes in the observed voltage. Thus the system can discriminate against spurious components of the observed signal. The knob 20 has a plurality of positions which vary the range of the system, thus adapting the system to observe signals with different voltage ranges.

Figure 2:
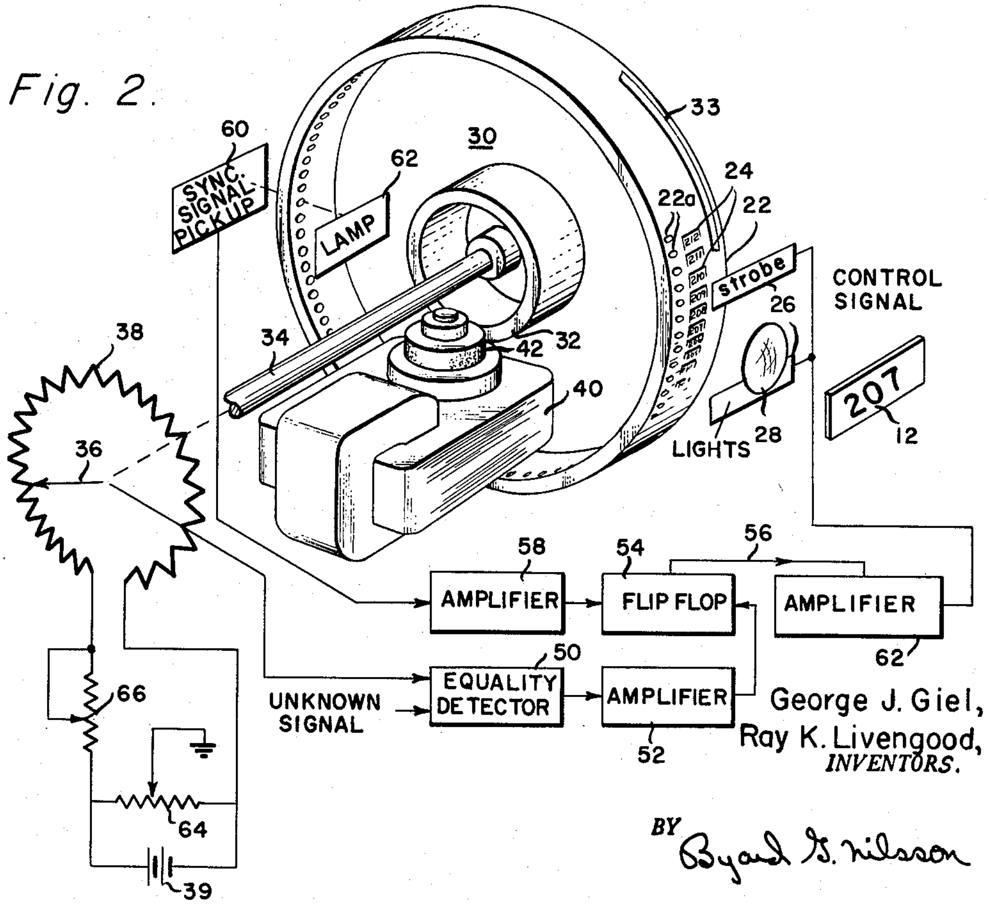
FIGURE 2 is a diagrammatic and perspective representation of one system constructed in accordance with the present invention.

Reference will first be made to FIGURE 2, for consideration of a preliminary embodiment which provides only the "digital" mode of operation. In FIGURE 2, there is shown a drum 22 having numbers 24 arranged in sequence upon its periphery. In the operation of the system, the drum 22 revolves continuously at a substantially constant speed. Strobe lamps 26 (adjacent the right side of the drum 22) are then energized approximately once during each revolution of the drum so as to illuminate a particular number which reflects a beam of light (having the configuration of the number) through a lens 28 to display the number on the screen 12. FIGURE 2 will now be considered in detail with regard to the manner in which the control signal for the strobe lamps 26 is developed to illuminate the drum 22 at the proper instants and provide digital readout.

The drum 22 comprises the rim of a wheel 30 having a hub 32. The numbers 24 on the periphery of the drum are highly reflective while the surrounding area is black and does not reflect light to any appreciable extent. Coinciding with the radial position of each number on the drum is a hole 22*a*, to pass light which forms a synchronizing signal. The drum also carries a strip 33 of colored material which may be variously placed thereon.

The wheel 30 is fixed upon a rotatable shaft 34 which also carries the movable element 36 of a potentiometer 38 that is energized by a battery 39. The movable element 36 and the wheel 30 are revolved by a motor 40, the rotor 42 of which bears against the edge of the hub 32. In this manner, the drum 22 and the element 36 are revolved in synchronism so that the number passing under the lens 28 substantially coincides to the voltage tapped by the movable element 36 from the potentiometer 38 (in the analog scale employed).

Figure 4:
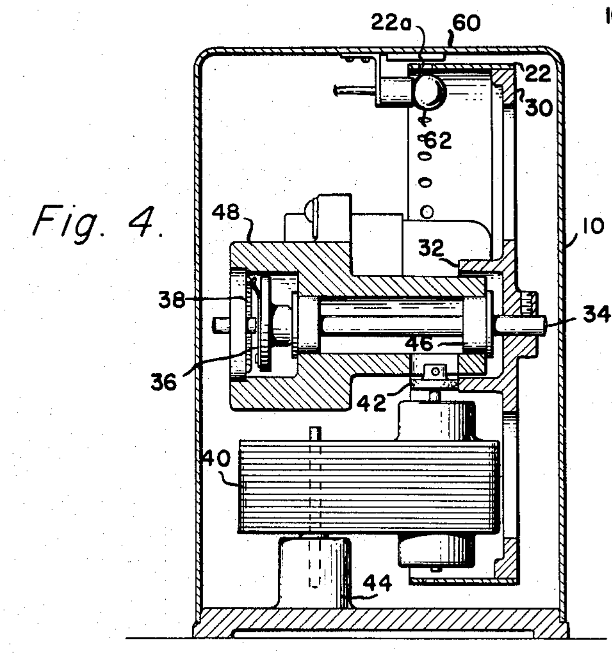
FIGURE 4 is a vertical sectional view taken along line 4—4 of FIGURE 1.
Figure 5:
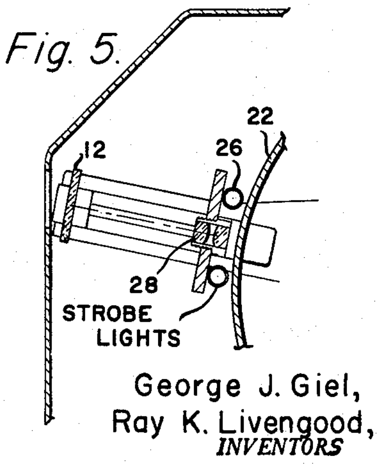
FIGURE 5 is a vertical sectional view taken along line 5—5 of FIGURE 1.

The manner in which the above-described elements are positioned in the cabinet 10 may be seen from a consideration of FIGURES 4 and 5. It is to be noted, that the motor 40 is mounted upon a base 44 which also serves to support the cabinet 10. Also the shaft 34 (carrying the wheel 30 and the movable element 36) is journaled into bearings 46 which are mounted in a frame 48. FIGURE 5 shows an arrangement of the strobe lamps 26 with respect to the drum 22, the lens 28 and the screen 12.

Returning now to FIGURE 2, the variable voltage received by the movable element 36 of potentiometer 38 is applied to an equality detector 50 along with the voltage to be observed. The detector 50 may comprise an amplitude-comparing circuit for providing an output pulse upon the occurrence of input signals of similar amplitudes. The details of one form for this circuit, satisfactory for use in the present invention will be considered hereinafter.

The output signal from the equality detector 50 is applied through an amplifier 52 to a flip-flop circuit 54. The flip-flop circuit 54 may take the form of the well-known bistable multivibrator which has two stable states. In the present system, the flip-flop 54 is employed as a variable-delay circuit and provides an output pulse to a conductor 56 upon a particular change of state. The flip-flop 54 is set upon receiving a signal from the amplifier 52, and is reset to form a pulse in conductor 56 upon receiving a signal from an amplifier 58.

The amplifier 58 is connected to receive a synchronizing or clock signal from a photo-electric pickup unit 60 which is positioned opposite a constantly-energized lamp 62 located at the other side of the drum 22. The synchronizing signal pickup unit 60 may comprise a photo diode energized to pass an electrical signal to the amplifier 58 upon receiving light from the lamp 52 through the holes 22 in the drum. Thus a synchronizing signal is formed consisting of pulses which occur at the instants when the numbers on the drum are centered relative to the screen 12. The system of FIGURE 2 thus serves primarily to illustrate the "digital" mode of operation, which will now be explained.

The equality detector 50 provides a pulse to amplifier 52 at the instant when the variable voltage from the potentiometer 38 equals the observed voltage. At that instant, the drum is positioned so that the number under the lens 28 most nearly coincides to the value of the observed voltage. To illuminate the next number, when it is squarely positioned under the lens 28, the pulse from the equality detector 50 is amplified (by the amplifier 52) and sets the flip-flop 56 in its temporary state. Thereafter, the centered position of the next number is indicated by the lamp 62 illuminating the pickup unit 60 through a drum hole 22*a*, to provide a pulse which is amplified (by the amplifier 58) and applied to reset the flip-flop 54. Thereupon, the flip-flop 54 produces a pulse which is amplified by an amplifier 62 and applied to the strobe lights 26 to illuminate the number on the drum 22, which is now centered on the screen 12. In this manner, numerical values represented by analog signals, e.g. voltages are presented by the drum 22. Also, particular ranges of the analog signal are commandingly presented in color. That is, the numbers adjacent the color strip 33 (which may comprise a section of colored tape) are presented in color as a result of colored light being reflected from the strip 33 to the screen 12. In this manner, excursions of the analog signal into zones of particular interest are readily observed.

In addition to the controls provided on the panel 10*a* of FIGURE 1, certain internal controls may be provided which are not often changed. In FIGURE 2, these controls include a zero-adjustment potentiometer 64 which is coupled across the battery 39 and has its variable terminal connected to ground so as to vary the zero-level of the apparatus. Another potentiometer 66 is connected as a variable resistance between the battery 39 and one fixed terminal of the potentiometer 38. This variable control serves to calibrate the instrument.

Figure 3:
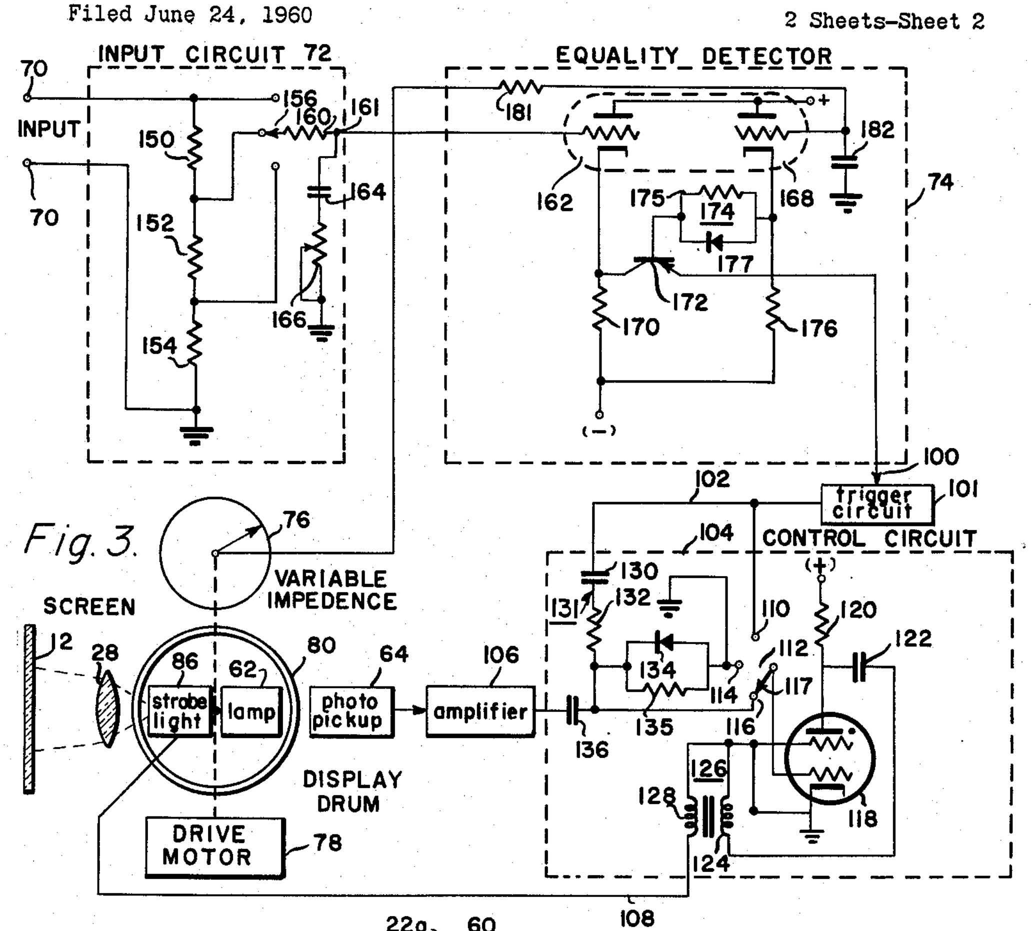
FIGURE 3 is a diagrammatic representation of another system constructed in accordance with the present invention.

Reference will now be had to FIGURE 3, which shows another embodiment of the invention in some detail. The basic operation of this system is similar to that of FIGURE 2, and both may employ similar mechanical structure as shown in FIGURES 1 and 4. However, it should be noted that the system of FIGURE 3 forms a number-configuration light beam by passing light from strobe lamps 86 through an aperture shaped as a number, rather than to reflect light from a number on the drum.

In the system of FIGURE 3, the observed voltage is applied through input terminals 70 to an input circuit 72, which varies the range of the system and controls the extent to which fluctuations in observed signals are damped. The output from this circuit is applied to an equality detector 74 which functions to form an output pulse upon receiving input signals of similar amplitude. The other input to the equality detector 74 is from a potentiometer 76 which is driven by a motor 78 that is also coupled to revolve a drum 80.

The output pulse from the equality detector indicates that the sweep voltage generated by the potentiometer 76 has reached the voltage of the observed signal. This pulse is applied through a trigger circuit 101, to a control circuit 104 which functions to variously illuminate the drum 80 depending upon whether the current mode of operation is "digital," "quasidigital" or "standby." The trigger circuit 101 may take the form of various threshold devices, or circuits which function to provide a well-formed pulse, upon receiving a signal above a predetermined level of amplitude.

Considering the operation of the control circuit 104 in detail, the input from the trigger circuit 101 is applied to a contact 110 of a multi-contact switch which is controlled by the mode-selection knob 16 on the front panel of the unit. The switch 112 also has stationary contacts 114 and 116, and a movable contact 117 which is connected to the control grid of a thyratron 118.

The plate of the thyratron is connected through a resistor 120 to a source of positive potential and also through a capacitor 122 and the primary winding 124 of a transformer 126 to ground. The second grid of the thyratron is connected to ground along with the cathode. The secondary winding 128 of the transformer 126 is connected between ground and a conductor 108, through which the strobe light 86 is energized.

At a time when the movable contact 117 of the switch 112 is in the center position (dwelling upon the stationary contact 114) the control grid of the thyratron is maintained at ground potential; therefore, all the elements of the circuit are energized, however, input pulses to the control circuit are ineffective to drive the thyratron 118 into conduction, and the system is in the "standby" mode.

When the movable contact 117 is positioned on the upper stationary contact 110, the pulse from the trigger circuit 101 (indicating the sweep voltage has reached the observed voltage) is applied directly to the control grid of the thyratron 118. Therefore, the thyratron is driven into conduction, its plate goes negative and a negative-going pulse is applied to the transformer 126 to be inverted, and energize the strobe lamps 86. Therefore, the drum 80 is illuminated at the precise position where amplitude similarity is detected, and a change in the observed voltage during this mode of operation will cause numbers to appear to slide past the screen 12.

If the movable contact 117 is placed in the lower "digital" position, energizing contact 116, it is connected to the trigger circuit 101 through conductor 102 and a coupling circuit including serially-connected condenser 130 and resistor 132, and a parallel circuit including a diode 134 and a resistor 135, connected between the terminal 116 and ground. The contact 116 is also connected to receive the synchronizing pulses from the amplifier 106 through a capacitor 136.

In this mode of operation, the relatively-wide pulse from the trigger circuit 101 is applied through the input circuit and the switch 112 to the control grid of the thyratron 118. However, this pulse alone (when coupled through the condenser 130) is not sufficient to drive the thyratron into conduction. Therefore, the thyratron is in a biased state ready to be fired, but still cut off.

After the passage of a very brief variable-delay interval, the next number of the drum 80 becomes centered on the screen 12 and the synchronizing pulse is then formed and applied through the amplifier 106, the capacitor 136 and the switch 112 to the grid of the thyratron 118. This pulse is sufficient to drive the biased thyratron into conduction, and energize the strobe lamps 86 as previously indicated to illuminate a numeral which is precisely centered on the screen 12.

Returning now to consider the input circuit 72 in detail, reference will continue to be made to FIGURE 3. The input terminals 70 are connected to a series of resistors 150, 152 and 154. The junction points between these resistors are connected to the stationary contacts of a movable switch 156. Therefore, depending upon the position of the switch 156, a varying amount of resistance appears across the input terminal and adapts the apparatus to different operating ranges. The voltage developed across these resistors by the observed signal is applied through a resistor 160 to a serially-connected capacitor 164 and a variable resistor 166 which is in turn connected to ground. The circuit including the capacitor 164 and the variable resistor 166 has a variable time constant. Therefore, the effect of rapid fluctuations in the observed signal upon the output voltage at the junction point 161 between the resistor 160 and the capacitor 164 may be varied. Therefore, the system may be damped to respond variously to changes in the observed signal.

The output from the circuit 72 is applied from the junction point 161 to the control grid of a triode section 162. The plate of the triode section 162 is connected to a source of positive potential along with the plate of a similar triode section 168. The cathode of the triode section 162 is connected through a resistor 170 to a source of negative potential, and to the collector electrode of a transistor 172. The cathode of the triode section 168 is connected through a parallel resistance-diode circuit 174 (including resistor 175 and diode 177) to the base of the transistor 172. Furthermore, the cathode of the triode section 168 is connected through a resistor 176 to a source of negative potential. The emitter electrode of the transistor 172 is connected through the conductor 100 to the trigger circuit 101 and comprises the output from the equality detector 74.

The second input to the equality detector (from the potentiometer 76) is applied through a resistor 181 to the grid of the triode section 168, which is grounded through a capacitor 182.

The operation of the equality detector to form a positive pulse in the conductor 100 depends upon the occurrence of similar-amplitude signals being applied to the two grids of the triode sections 162 and 168. If the signal applied to the grid of the section 162 exceeds that on the grid of the section 168 (which is normally the initial situation) the voltage at the cathode of the section 162 also exceeds the voltage at the cathode of the section 168. In this event, the transistor 172 is maintained cut off. However, at the instant when the voltage of the cathode 162 becomes equal to the voltage of the cathode of the section 168, a current flows through the diode 177 and renders the transistor conductive to pass a signal to the trigger circuit 101.

An important aspect of the present invention resides in the damping control employed in the input circuit to enable the effect of rapid fluctuations in the observed signal, or spurious signal components, to be dampened.

Another important feature of the present invention resides in the provision of a variable time circuit to assure that values are observed at a precisely-correct interval. It should be noted, that although the particular embodiments of the invention described are fully capable of providing these advantages and achieving the objects set forth, such embodiments are merely illustrative and this invention is not limited to the details of construction illustrated and described herein, except as defined by the appended claims.

We claim:

1. A system for manifesting numerical values in digital form, which values are represented by an analog signal, comprising: comparison means for providing an output signal upon receipt of a pair of similar input signals, said comparison means being adapted to be connected to receive said analog signal as one input signal; signal-controlled rotatable manifesting means for manifesting digital numerical values according to the rotary position thereof upon receipt of a control signal; rotatable signal-generating means for generating a variable signal according to the rotary position thereof, said signal-generating means being connected to apply said variable signal to said comparison means as the other input signal; means for revolving said signal-generating means and said manifesting means in synchronism so that numerical values presented to be manifested by said manifesting means coincide in time to the value of said variable signal from said signal-generating means; and variable-delay means connected to receive said output signal from said comparison means, to produce a control signal for said manifesting means whereby said control signal is applied to said manifesting means at predetermined rotary positions thereof to cause manifestation of a digital value.

2. Apparatus according to claim 1 wherein said variable delay means comprises: means for sensing said predetermined rotary position of said manifesting means to form a synchronizing signal; circuit means connected to receive said synchronizing signal and said output signal from said comparison means, for providing a control signal for said manifesting means upon the occurrence of a synchronizing signal following an output signal.

3. Apparatus according to claim 2 wherein said circuit means comprises a two-state circuit which is conditioned by said output signal and thereafter provides said control signal upon receipt of a synchronizing signal.

4. Apparatus according to claim 2 wherein said circuit means comprises a trigger circuit which provides a pulse having a duration at least as great as the interval between said synchronizing pulses; and a threshold circuit connected to receive said pulse and said synchronizing signals for providing a control signal upon the coincidence thereof.

5. Apparatus according to claim 2 wherein said means for sensing said predetermined rotary positions of said manifesting means comprises: index means carried upon said manifesting means; and photo-electric means for sensing said index means to provide said synchronizing signal.

6. Apparatus according to claim 1 wherein said manifesting means comprises: a drum having digital representations upon the periphery thereof; and electrooptical means for providing a visual representation of said digital representation upon receiving a control signal.

7. Apparatus according to claim 1 wherein said signal-generating means comprises a variable potentiometer and means for energizing said potentiometer so as to adjust the level of voltages therefrom.

8. Apparatus according to claim 1 wherein said comparison circuit includes an adjustable coupling circuit for receiving said analog signal, whereby to vary the sensitivity of said equality detector to rapid fluctuations of said analog signal.

9. A system for manifesting numerical values in digital form, which values are represented by an analog signal, comprising: an input circuit adapted to be connected to receive said analog signal and having a variable time constant; comparison means for providing an output signal upon receipt of a pair of similar input signals, said comparison means being adapted to be connected to receive said analog signal as one input signal from said input circuit; signal-controlled rotatable manifesting means for presenting digital numerical values for manifestation according to the rotary position thereof, and being operative upon receipt of a control signal, said manifesting means being connected to receive said output signal from said comparison means as a control signal; rotatable signal-generating means for generating a variable signal according to the rotary position thereof, said signal-generating means being connected to apply said variable signal to said comparison means as the other input signal; and means for revolving said signal-generating means and said manifesting means in synchronism so that numerical values presented by said manifesting means coincides to the value of said variable signal from said signal-generating means.

10. A system for manifesting numerical values in digital form, which values are represented by an analog signal, comprising: an input circuit adapted to be connected to receive said analog signal and having a variable time constant; comparison means for providing an output signal upon receipt of a pair of similar input signals, said comparison means being adapted to be connected to receive said analog signal as one input signal from said input circuit; signal-controlled rotatable manifesting means for manifesting digital numerical values according to the rotary position thereof upon receipt of a control signal, said manifesting means being connected to receive said output signal from said comparison means as a control signal; rotatable signal-generating means for generating a variable signal according to the rotary position thereof, said signal-generating means being connected to apply said variable signal to said comparison means as the other input signal; means for revolving said signal-generating means and said manifesting means in synchronism so that numerical values to be manifested by said manifesting means coincide to the value of said variable signal from said signal-generating means; and variable-delay means connected to receive said output signal from said comparison means, to produce a control signal for said manifesting means whereby said control signal is applied to said manifesting means at predetermined rotary positions thereof.

11. Apparatus according to claim 10 wherein said manifesting means includes a colored section to manifest preselected of said digital numerical values with color.

12. Apparatus according to claim 10 wherein said rotatable manifesting means comprises a rotatable drum having digital values placed thereon, and means for illuminating said drum upon receipt of a control signal.

References Cited in the file of this patent

UNITED STATES PATENTS

| | | |
|---|---|---|
| 2,787,418 | MacKnight et al. | Apr. 2, 1957 |
| 2,905,897 | Giel | Sept. 22, 1959 |